United States Patent [19]

Corpart et al.

[11] Patent Number: 6,124,382
[45] Date of Patent: Sep. 26, 2000

[54] USE OF MULTI-BLOCK COPOLYMERS AS THERMO-THICKENERS

[75] Inventors: Pascale Corpart, Sannois; Hervé Adam, Fosses; Dominique Charmot, Le Pre-Saint-Gervais, all of France

[73] Assignee: Rhodia Chimie, Courbevoie, France

[21] Appl. No.: 09/029,702

[22] PCT Filed: Sep. 6, 1996

[86] PCT No.: PCT/FR96/01373

§ 371 Date: Sep. 8, 1998

§ 102(e) Date: Sep. 8, 1998

[87] PCT Pub. No.: WO97/09400

PCT Pub. Date: Mar. 13, 1997

[30] Foreign Application Priority Data

Sep. 8, 1995 [FR] France .................................. 95 10517

[51] Int. Cl.$^7$ ...................................................... C08K 5/39
[52] U.S. Cl. ...................... 523/501; 524/609; 528/367; 528/403; 528/417; 528/421; 528/425; 528/390; 558/233; 558/235; 558/236; 558/237
[58] Field of Search .............................. 524/609; 528/367, 528/403, 417, 421, 425, 390; 558/233, 235, 236, 237; 523/501

[56] References Cited

FOREIGN PATENT DOCUMENTS

| | | |
|---|---|---|
| 418118 A1 | 3/1991 | European Pat. Off. . |
| 539256 A1 | 4/1993 | European Pat. Off. . |
| 583814 A1 | 2/1994 | European Pat. Off. . |

OTHER PUBLICATIONS

Journal of Macromolecular Science, Chemistry, A27(6), pp. 791–806, Nair et al., 1990.

*Primary Examiner*—Robert Dawson
*Assistant Examiner*—Kuo-Liang Peng
*Attorney, Agent, or Firm*—John Daniel Wood; Jean-Louis Seugnet

[57] ABSTRACT

The invention concerns the use as thermothickeners of multi-block copolymers of general formula (I) or (II):

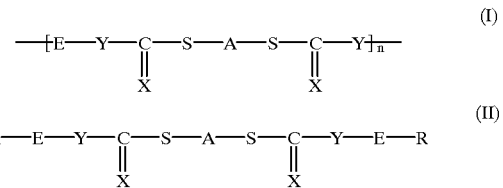

wherein E designates a polyoxyalkylene sequence; A designates a water-soluble polymer sequence; X is a sulphur or oxygen atom; Y is an oxygen atom or an —N—R' group, R' being a linear or branched alkyl; R is a linear or branched alkyl, aralky or alkylaryl group; and n is such that the molecular mass of the multi-block copolymers Mp is greater than 250,000 g/mol.

17 Claims, No Drawings

USE OF MULTI-BLOCK COPOLYMERS AS THERMO-THICKENERS

This application is an application under 35 U.S.C. Section 371 of International Application Number PCT/FR96/01373, filed on Sep. 6, 1996.

The present invention relates to polymers having thermally-induced thickening properties in aqueous medium.

The term thermally-induced thickening polymers is understood to mean polymers whose viscosity in aqueous medium remains constant or increases over a wide temperature range, in contrast with standard polymers whose viscosity decreases substantially as the temperature increases.

EP-A-583,814 has described polymers having thermally-induced thickening properties, said polymers being in the form of copolymers consisting of a fully water-soluble chain on which other segments having a water-soluble transition at a critical temperature referred to as LCST (low critical soluble temperature) are grafted. Above the critical temperature, the segments which have become hydrophobic have a tendency to associate together, leading to the formation of a network of high molecular mass and thus to an increase in viscosity, or at least not to a decrease in viscosity, thereby generating the thermally-induced thickening property. Thus, in the prior art, it is possible to obtain thermally-induced thickening properties for polymers only at temperatures above the critical temperature (LCST) of the segments showing the water-soluble/hydrophobic transition.

Now, the critical temperature of the segments given as examples in the prior art can be high; it is, for example, above 100° C. for polyoxyethylene. The thermally-induced thickening effect appears, in this case, only at temperatures for which this effect is not always sought. Thus, it is not possible to use certain thermally-induced thickening polymers in applications carried out at low temperature.

One solution is to use said thermally-induced thickening polymers in the presence of a salt which makes it possible to develop the thermally-induced thickening effect at a lower temperature. However, it is not possible to introduce a salt in the context of certain applications such as plant-protection applications or paper industry applications.

One object of the invention is thus to propose polymers having thermally-induced thickening properties at a temperature below the critical temperature LCST of the chain members.

Another object of the invention is to propose a means for controlling the temperature at which the thermally-induced thickening effect appears for a copolymer in which the nature of the water-soluble chain and of the chain members is given.

With this aim, the invention relates to the use, as thermally-induced thickening agents, of linear multiblock copolymers of general formula (I) or (II)

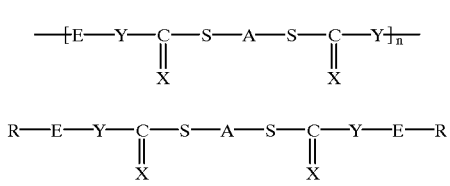

in which:

E represents a polyoxyalkylene block, each alkylene chain member having not more than 6 carbon atoms, A represents a water-soluble polymer block derived from at least one monomer chosen from ethylenic monomers, X is a chalcogen, Y is an oxygen atom or a group —N—R', R' being:
  a linear or branched alkyl group optionally comprising at least one hetero atom and optionally a tertiary amine group, or
  a $C_3$–$C_8$-cycloalkyl radical, or
  an aryl, aralkyl or alkylaryl group, R is a linear or branched alkyl, aralkyl or alkyl-aryl group, n is such that the molecular mass of the multiblock copolymers Mp is greater than 250,000 g/mol, preferably greater than 270,000 g/mol and even more preferably greater than 400,000 g/mol.

The copolymers according to the invention are linear and have no side segments grafted onto the main chain of the type A. They have an alternation of polyoxyalkylene polymer blocks E and of water-soluble polymer blocks A derived from ethylenic-type monomers, joined together by a linking unit:

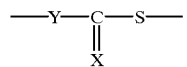

In the multiblock copolymers according to the invention, the polyoxyalkylene blocks E have a critical temperature (LCST), whereas the polymer blocks A are water-soluble in any temperature range.

The copolymers used must have a molecular mass of greater than 250,000 g/mol, said molecular mass being measured by gel chromatography (GPC) in aqueous phase, in polyoxyethylene equivalents.

In general, multiblock copolymers are used in which the polyoxyalkylene blocks E contain a number of units i of at least 25, preferably of not more than 1000, even more preferably of between 200 and 400.

According to the invention, and preferably, multiblock polymers are used in which the weight content T of polyoxyalkylene blocks E is at least 3%, preferably not more than 50%, even more preferably between 5 and 20%.

Among the copolymer blocks according to the invention, mention will be made most particularly of those of formula (I) or (II) in which the chain members of the polyoxyalkylene blocks E having a water-soluble/hydrophobic transition are chosen from those of the following formulae:

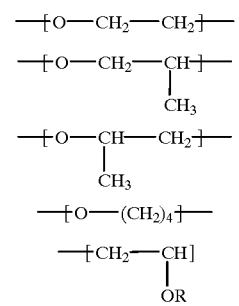

it being possible for R to be a methyl or ethyl group.

The polyoxyalkylene blocks E are preferably polyethylene oxide blocks.

The water-soluble polymer blocks A can be derived from, the polymerization of water-soluble ethylenic monomers and in particular vinyl or diene monomers. These can be, for example, the following water-soluble ethylenic monomers:
acrylic and methacrylic monomers chosen more particularly from:
acrylic acid or methacrylic acid,
acrylamides and derivatives thereof such as (meth) acrylamides, N(monoalkyl)acrylamides or N(dialkyl) acrylamides,
fumaric acid or maleic acid,
sulfone monomers chosen from sulfoacetyl(meth) acrylates, 2-acrylamide-methylpropane sulfonic (AMPS) acid and alkaline salts thereof, vinylsulfonate and methallylsulfonate.

Advantageously, the blocks A are derived from the polymerization of acrylic acid, AMPS or acrylamide.

The water-soluble blocks A can advantageously be derived from the polymerization of water-soluble ethylenic monomers and a small amount of organosoluble ethylenic monomers. This small amount of organosoluble monomers makes it possible to control the solubility of the hydrophilic blocks A in water. The relative amounts of these two types of monomer in the blocks A are adjusted according to the knowledge of those skilled in the art.

These organosoluble ethylenic monomers can be chosen from:
$C_1-C_{12}$alkyl acrylates and methacrylates such as methyl methacrylate or butyl methacrylate,
styrene monomers such as styrene, α-methyl-styrene, tert-butylstyrene and vinyltoluene,
vinyl esters, butadiene, chloroprene, isoprene, etc.

Preferably, multiblock copolymers are used in which X is a sulfur atom and Y is an oxygen atom. In this case, multiblock polymers are obtained in which the blocks are joined together by xanthate disulfide linking units:

In general, the content of thermally-induced thickening copolymer in the medium to be thickened is not more than 15% by weight, preferably at least 0.5%.

For the synthesis of the multiblock copolymers according to the invention, a person skilled in the art can use the standard copolymerization techniques. In particular, for the synthesis of copolyrners for which x is a sulfur atom and Y is an oxygen atom (which corresponds to polymers incorporating xanthate disulfide groups), a skilled worker can reproduce the method described in EP-A-0,539,256 filed by the Applicant. For the preparation of copolymers for which X is a sulfur atom and Y is a group N—R' (which corresponds to polymers incorporating thiuram disulfide groups), a skilled worker can reproduce the methods described in EP-A-0,342,073 and EP-A-0,418,118.

The block copolymers according to the invention can be used in applications in which it is desired to maintain a level of viscosity over a wide temperature and application range in the presence or absence or salt.

It is possible, for example, to use the copolymers described above in the paper industry, in the paints industry, in industrial cleaning fluids, in hydraulic fluids and in particular water-based lubricants or in the drilling and cementation fluids of oil wells.

Said fluids can be used in particular in the paper industry in paper layering baths, in carticular in for aqueous formulations for layering paper, or in industrial paints for drying paints by heating.

The polymers used according to the invention have the advantage of having a thermally-induced thickening effect at a temperature below the critical temperature of their polyoxyalkylene blocks, without it being necessary no add a salt. This effect can optionally be exacerbated by using copolymers in basic medium, for example by adding a base such as sodium hydroxide.

The examples which follow illustrate the invention without, however, limiting the scope thereof.

EXAMPLES

Example 1

PAA/POE Multiblock Copolymer of Molecular Mass 270,000 g/mol

Preparation:

Polyoxyethylene xanthate (POEX) disulfide "ferters" of molecular mass 10,000 g/mol are prepared according to the teaching of patent application EP-A0,539,256.

Next, starting with these (POEX) ferters, a polyacrylic acid/polyoxyathylene (PAA/POE) multiblock copolymer is prepared, again according to the teaching of patent application EP-A-0,539,256. For this, 24 g of the polyoxyechylenes obtained are dissolved in 600 ml of water. The solution is then brought to 75° C. 200 g of acrylic acid as a 75 solution in water and 0.6 g of ammonium persulfate are then added simultaneously over 2 hours. The reaction medium is maintained at 75° C. for a further 2 hours.

The polyacrylic acid/polyoxyethylene (PAA/POE) copolymer obtained contains 12% by weight of is POE of mass 10,000 g/mol, thus in which the number of units i is 227. Its molecular mass is measured in polyoxyethylene equivalents by GPC in aqueous phase: it is 270,000 g/mol.

This multiblock copolymer incorporating xanthate disulfide groups has the following formula:

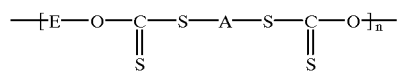

in which:
E is the polyethylene oxide block,
A is a polymer block derived from the acrylic acid monomer.

Thermally-induced Thickening Property:

This copolymer is dissolved to a level of 10% in water. The solution is neutralized to pH=11 by adding sodium hydroxide and the Brookfield viscosity is then measured at 50 t/min for different temperatures. The results are collated in Table 1.

TABLE 1

| T(° C.) | Viscosity (mPa · s) |
|---|---|
| 23 | 1720 |
| 33 | 1100 |
| 60 | 650 |
| 70 | 740 |
| 80 | 940 |

It is observed that this copolymer has a thermally-induced thickening effect at and above 70° C. without the addition of salt, whereas the polyoxyethylene (POE) blocks have an LCST of greater than 100° C.

Example 2

PAA/POE Multiblock Copolymer of Molecular Mass 400,000 g/mol

A polyacrylic acid/polyoxyethylene copolymer containing 12% by weight of POE of molecular mass 10,000 g/mol, i.e. a number of units i of 227, is obtained according to the procedure described in Example 1, but with 0.4 g of ammonium persulfate. Its molecular mass in polyoxyethylene equivalents is measured by GPC, and is 400,000 g/mol.

After dissolving in water to a proportion of 10% by weight, the pH is brought to 4 with sodium hydroxide and the viscosity is measured as a function of the temperature using a Carri-med type rheometer.

The results are collated in Table 2.

TABLE 2

| T(° C.) | Viscosity (mPa · s) |
|---------|---------------------|
| 40      | 900                 |
| 50      | 800                 |
| 55      | 1000                |
| 60      | 1900                |
| 70      | 5600                |

It is observed that in the absence of salt, a thermally-induced thickening effect is obtained at and above 50° C.

Comparative Example 3

PAA/POE multiblock Copolymer of Molecular Mass 200,000 g/mol

A polyacrylic acid/polyoxyethylene copolymer containing 12% by weight of POE of molecular mass 10,000 g/mol, i.e. a number of units i of 227, is obtained according to the procedure described in Example 1, but with 1.5 g of ammonium persulfate. Its molecular mass in POE equivalents is measured by GPC, and is 200,000 g/mol This copolymer is dissolved to a level of lot, in water and the solution is neutralized to pH=11 by adding sodium hydroxide. Its Brookfield viscosity at 50 t/min is measured by varying the temperature in the salt and in the presence of 18% by weight of $Na_2CO_3$ in the solution. The results are collated in Table 3.

TABLE 3

| T(° C.) | Viscosity in the presence of salt (mPa · s) | Viscosity in the absence of salt (mPa · s) |
|---------|---------------------------------------------|---------------------------------------------|
| 23      | 24,400                                      | 140                                         |
| 33      | 21,000                                      | 72                                          |
| 50      | 18,000                                      | 42                                          |
| 70      | 23,600                                      | 34                                          |

It is observed that this multiblock copolymer has a thermally-induced thickening effect at a below 100° C. only in the presence of salt.

What is claimed is:

1. A method for maintaining or increasing the viscosity of an aqueous medium comprising the step of adding a thermally-induced thickening amount of a multiblock copolymer of general formula (I) or (II):

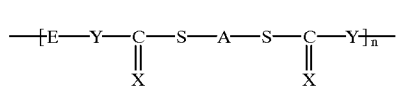

(I)

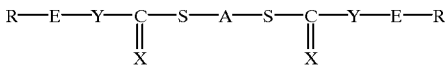

wherein:
   E represents a polyoxyalkylene block, each alkylene chain member having not more than 6 carbon atoms;
   A represents a water-soluble polymer block prepared from at least one ethylenic monomer;
   X is a sulfur or oxygen atom;
   Y is an oxygen atom or a group —N—R',R' being:
   a linear or branched alkyl group, optionally comprising at least one hetero atom or a tertiary amine group, a $C_3$–$C_8$-cycloalkyl radical, an aryl, an aralkyl or an alkylaryl group;
   R is a linear or branched alkyl, a linear or branched aralkyl or a linear or branched alkylaryl group; and
   n is such that the molecular mass of the multiblock copolymers Mp is greater than 250,000 g/mol; and
said viscosity being maintained or increased at a temperature below the critical temperature of the polyoxyalkylene blocks E.

2. A method according to claim 1, wherein the molecular mass is greater than 270,000 g/mol.

3. A method according to claim 2, wherein the molecular mass is greater than 400,000 g/mol.

4. A method according to claim 1, wherein the polyoxyalkylene blocks E have a number of units i of at least 25.

5. A method according to claim 4, wherein the number of units i is between 200 and 400.

6. A method according to claim 1, wherein the weight content T of polyoxyalkylene blocks E in the multiblock copolymers is at least 3%.

7. A method according to claim 6, wherein the weight content T is between 5 and 20%.

8. A method according to claim 1, wherein the chain members of the polyoxyalkylene blocks E in the multiblock copolymers are of the following formulae:

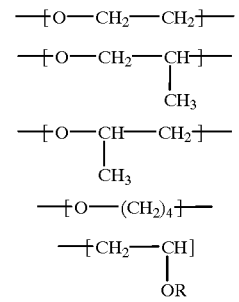

wherein R is a methyl or ethyl group.

9. A method according to claim 1, wherein the polyoxyalkylene blocks E are polyethylene oxide blocks.

10. A method according to claim 1, wherein the water-soluble polymer blocks A in the multiblock copolymers are made by polymerization of acrylic acid, AMPS or acrylamide.

11. A method according to claim 1, wherein X is a sulphur atom and Y is an oxygen atom.

12. A method according to claim 1, wherein the thermally-induced thickening amount of copolymer in the medium to be thickened is not more than 15% by weight.

13. A method according to claim 12, wherein the amount is at least 0.5%.

14. A method according to claim 1, wherein the medium is a paint, an industrial cleaning fluid, a hydraulic fluid, a water-based lubricant, a drilling fluid of oil wells, or a cementation fluids of oil wells.

15. A method according to claim 1, farther comprising the step of adding a base to said medium.

16. A method according to claim 1, wherein said base is sodium hydroxide.

17. A method according to claim 1, wherein no base is added to said medium.

* * * * *